United States Patent Office 3,283,292
Patented Nov. 1, 1966

3,283,292
ULTRASONIC POSITION SENSING EQUIPMENT
Leslie Kay, Kenilworth, England, assignor to Ultra Electronics Limited, a corporation of Great Britain
Filed Mar. 2, 1964, Ser. No. 348,494
Claims priority, application Great Britain, Mar. 2, 1963, 8,440/63
3 Claims. (Cl. 340—1)

There are many occasions in industry when it is required to determine the position of an object relative to a reference point, without physical contact being made with the object. Photoelectric devices and light beams have been used but have their disadvantages; and to overcome these, an ultrasonic method has been developed which is described below.

The distance from a reference point to an object is measured by the time delay between transmitting from the reference point an ultrasonic signal and receiving at the reference point the echo from the object. If there were only one object in the sound field a simple system could be used for determining the distance, but in general there are many objects in the vicinity of the one to be sensed, and echoes from these objects could be greater in amplitude than the wanted echo. This would produce ambiguous results due to multiple reflections arriving at the same instant as the wanted echo. In such circumstances no amount of signal processing could eliminate the errors which might arise.

In accordance with this invention, then, the echo-responsive part of the equipment remains inoperative until a time has elapsed since the transmission of the signal which is to give rise to the echo, which time can be predetermined within the equipment in accordance with the supposed distance of the "wanted" object.

In accordance with a further feature of the invention, the equipment is refined by what is hereinafter referred to as a "crossed-beam" transmission and reception.

Due care must be taken to ensure that the point of crossing the beams is in the near Fraunhofer region so that the maximum effect is obtained when a high degree of resolution is required. The effective beam width is then considerably narrower than for two parallel beams as is the conventional practice. (The crossing of the beams at the focal point should not be confused with angled probes designed to reduce the "dead space" in some ultrasonic systems.)

The invention can be made use of in a manufacturing or like process, wherein objects are placed in somewhat random manner upon a moving belt and are subjected to a certain operation when, with the travel of the belt, they reach a certain position. Then, an equipment in accordance with this invention can be "focussed" on this certain position, and can respond to the arrival of an object at this position by causing the operation to be performed. Thus in the manufacture of chocolates, the "certain operation" may be to drop a walnut onto a partly made chocolate. The chocolates arrive with random longitudinal spacing on a traveling belt, this belt carrying perhaps a number of longitudinal rows of chocolates. It is then important, firstly that the arrival of a chocolate in a certain row at the walnut-dropping position shall be recognised and acted upon by the dropping mechanism pertaining to that row, and secondly that the presence of chocolates in adjacent rows and elsewhere in the same row shall be disregarded by that said mechanism.

The following description relates to the drawings accompanying the provisional specification.

Referring to the drawings.

Figure 1:
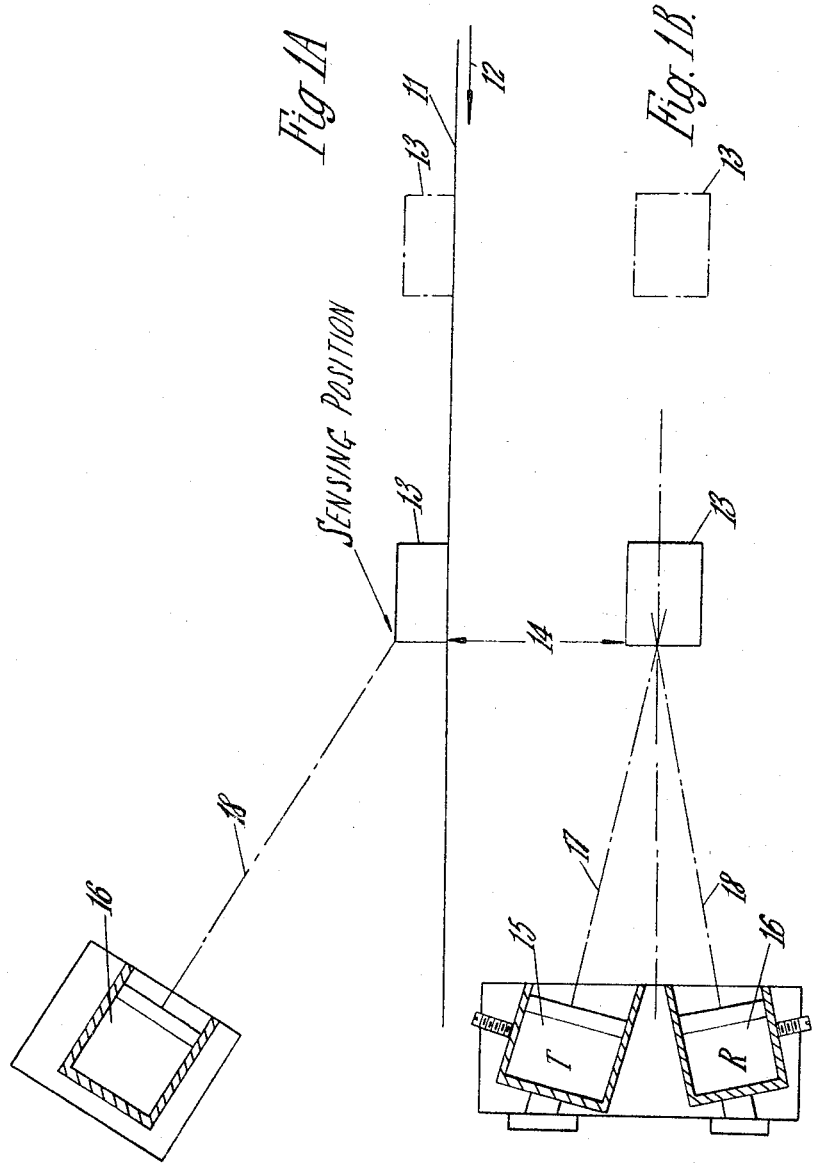
FIGURE 1A is an elevational view showing a method of mounting the transmitting and receiving transducers.
FIGURE 1B is a plan view of the transmitting and receiving transducers shown in FIGURE 1A.

Referring to FIGURE 1 of the drawings, it will be seen that there is a belt 11 moving in the direction of the arrow 12 and carrying objects 13 which are to be brought in succession to the sensing position 14 where an operation is to be performed. The presence of an object 13 at the position 14 is detected by an equipment including a transmitting transducer 15 and a receiving transducer 16. These two transducers are highly directional in their transmission and reception, the axes of maximum sensitivity being indicated by the lines 17 and 18 respectively. It will be noted that these axes 17 and 18 intersect at the sensing position 14: this is the "crossed beam" arrangement referred to elsewhere in this specification. It will also be noted (FIGURE 1A) that the beams 17 and 18 are inclined downwardly from the transducers to the belt 11.

Figure 2:
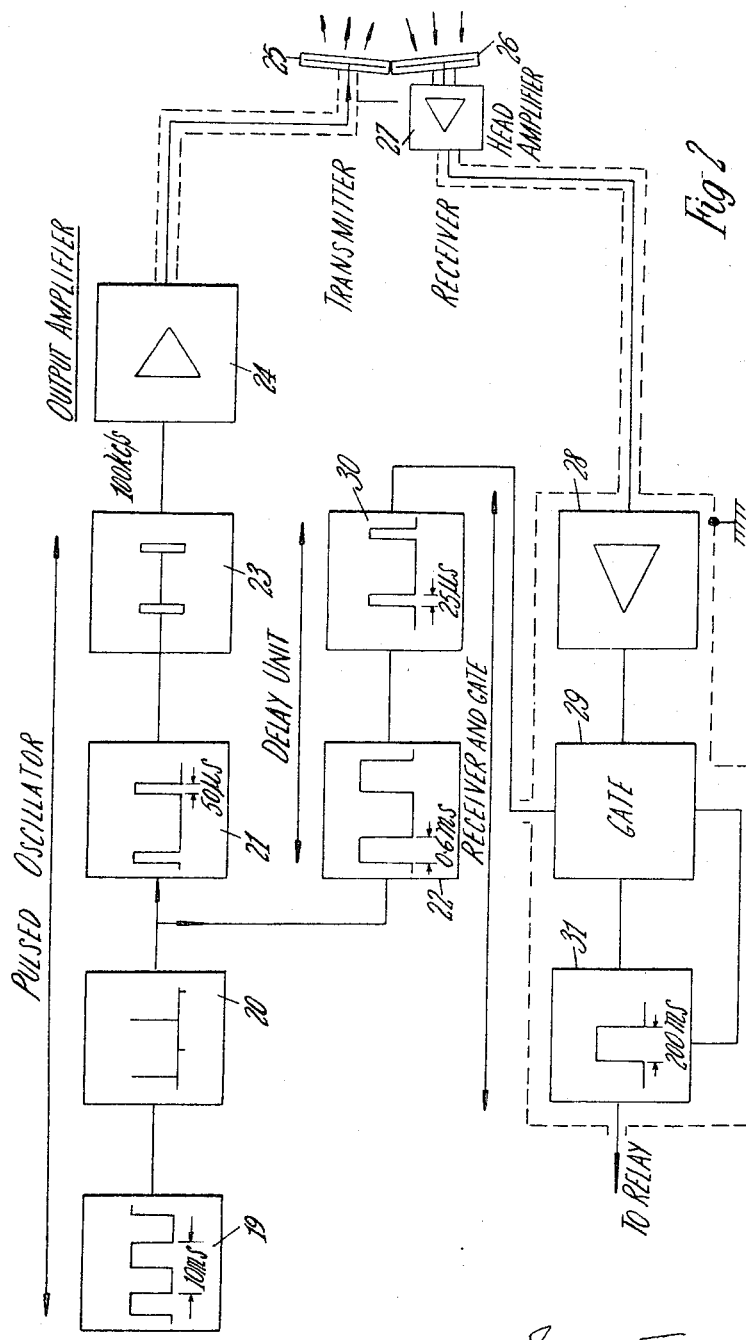
FIGURE 2 is a block schematic of an apparatus which detects the presence of an object in a predetermined position.

Referring now to FIGURE 2 of the drawings, a free running multivibrator 19 generates a square wave which is fed in a differentiating circuit 20, the output from which triggers two pulse generators 21 and 22. The output of 21 pulses "on" an ultrasonic oscillator 23 and the pulses of oscillation are fed via an amplifier 24 to the transmitter transducer 25. The ultrasonic energy reflected from an object in the region under test is picked up by the receiver transducer 26, passed via the head amplifier 27 to the main amplifier 28 and into the gate 29. The gate 29 is opened for a short period by a pulse from pulse generator 30 triggered by the back edge of a pulse from generator 22 which was initiated at the same time as the transmitted pulse. The width of the pulse from 22 is variable and set such that the gate 29 is opened only at the time signals reflected from area under test would be expected. The output from gate 29, if present, triggers an output pulse generator 31. The output of 31 is fed out to be used for control purposes.

Figure 3:
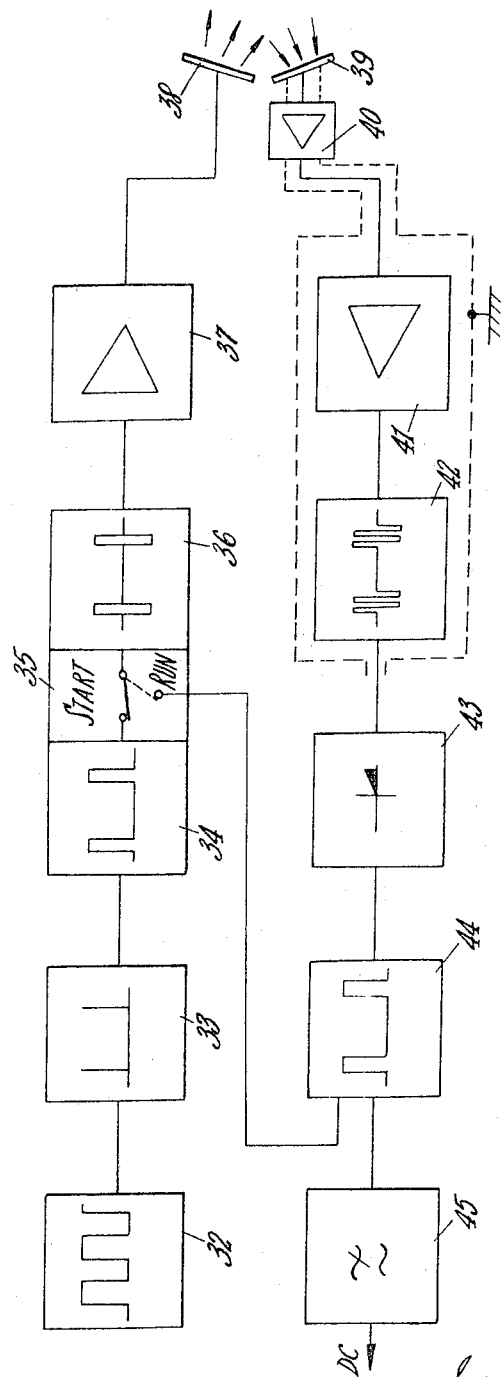
FIGURE 3 is a block schematic of an apparatus for continuously detecting and measuring the position of a moving object within adjustable limits.

Another embodiment of the invention is shown in FIGURE 3.

A free running multivibrator 32 generates a square wave which is fed to a differentiating circuit 33, the output from this triggers a pulse generator 34. The output from the pulse generator 34 is fed via the start/run switch 35 in the start position to an ultrasonic oscillator 36 where is is used to start and stop the oscillator output. The pulses of ultrasonic frequency oscillation are fed via output amplifier 37 to the transmitter transducer 38. Pulses of ultrasonic energy are directed at an angle towards the surface whose position it is desired to measure. The receiver transducer 39 is angled to pick up the signal reflected from the surface, multiple reflections between the surface and transducer are not received. The transducer output is amplified by the head amplifier 40 and the further amplifying stages 41 and 42. The pulse is fed to detector 43 the output of which triggers a pulse generator 44. The pulse output from 44 is fed via the start/run switch, now turned to the "run" position, to the ultrasonic oscillator which runs for the duration of the pulse, the pulse being fed to the transmitter transducer as previously described. The echo pulse is picked up as before and the system oscillates at a frequency dependent upon the distance of the reflecting surface from the transducer heads. The output pulses from the pulse generator 44 can be counted to give a measure of distance or fed into a filter 45 which produces a D.C. voltage proportional to distance of the surface. This voltage can be used for control purposes.

What I claim is:

1. An ultrasonic apparatus for locating the position of a target through the use of a highly directional ultrasonic signal reflected from said target comprising:
   a transmitter for generating and emitting highly directional ultrasonic signals on a first signal transmission axis extending between said transmitter and said target;
   a receiver located adjacent said transmitter for detecting ultrasonic signals reflected from said target on a second signal transmission axis extending between said receiver and said target, said signals emitted by said transmitter and reflected from said target being highly directional along said second axis, said second axis intersecting said first axis at said target;
   a delay circuit operatively connected to and energized by said transmitter, said delay circuit being energized simultaneously with the generation of a signal by said transmitter, said delay circuit providing an output signal substantially at the time said receiver detects a signal on said second axis;
   an output means; and
   a gate operatively connected to said delay circuit, said receiver, and said output means for energizing said output means upon the simultaneous reception of signals from said receiver and said delay circuit.

2. An ultrasonic apparatus according to claim 1 wherein said delay circuit comprises:
   a first triggered pulse generator operatively connected to and energized by said transmitter; and
   a second triggered pulse generator operatively connected to and triggered by said first pulse generator, and operatively connected to said gate.

3. An ultrasonic apparatus for locating the position of a target through the use of a highly directional ultrasonic signal reflected from said target comprising:
   a transmitter for generating and emitting highly directional ultrasonic signals on a first signal transmission axis extending between said transmitter and said target;
   a starting circuit for initiating operation of said transmitter comprising a first source of pulses, connected in series with a differentiator and a second source of pulses;
   a start-run switch, said switch connecting said transmitter with said starting circuit when operated to its start position;
   a receiver located adjacent said transmitter for detecting ultrasonic signals reflected from said target on a second signal transmission axis extending between said receiver and said target, said signals emitted by said transmitter and reflected from said target being highly directional along said second axis, said second axis intersecting said first axis at said target;
   an output means; and
   a triggered pulse generator operatively connected to said receiver, said output means, and said start-run switch whereby said generator operates said transmitter at a frequency dependent on the distance of said target from said transmitter and said receiver when said start-run switch is operated to the run position.

References Cited by the Examiner

UNITED STATES PATENTS

| 2,333,688 | 11/1943 | Shepard | 340—3 X |
| 2,567,229 | 9/1951 | Morse | 340—3 |
| 2,998,591 | 8/1961 | Lovett | 340—1 |
| 3,017,832 | 1/1962 | MacDonald | 102—18 |
| 3,042,899 | 7/1962 | Kendall et al. | 340—1 X |
| 3,046,519 | 7/1962 | Polster | 340—38 |
| 3,149,561 | 9/1964 | Lancaster | 340—1 X |

FOREIGN PATENTS 876,998   9/1961   Great Britain.

CHESTER L. JUSTUS, *Primary Examiner.*

R. A. FARLEY, *Assistant Examiner.*